US009130667B2

(12) United States Patent
Sozanski et al.

(10) Patent No.: US 9,130,667 B2
(45) Date of Patent: Sep. 8, 2015

(54) RADIO FREQUENCY MULTIPATH CHANNEL EMULATION SYSTEM AND METHOD

(71) Applicant: Octoscope, Inc., Littleton, MA (US)

(72) Inventors: James Sozanski, Bolton, MA (US); Ted Grosch, Bolton, MA (US)

(73) Assignee: Octoscope Inc., Littleton, MA (US)

( * ) Notice: Subject to any disclaimer, the term of this patent is extended or adjusted under 35 U.S.C. 154(b) by 0 days.

(21) Appl. No.: 14/187,513

(22) Filed: Feb. 24, 2014

(65) Prior Publication Data

US 2014/0241408 A1 Aug. 28, 2014

Related U.S. Application Data

(60) Provisional application No. 61/768,165, filed on Feb. 22, 2013.

(51) Int. Cl.
*H04B 17/00* (2015.01)

(52) U.S. Cl.
CPC .................................. *H04B 17/0087* (2013.01)

(58) Field of Classification Search
CPC .................................................. H04B 17/0087
USPC .......................................................... 375/224
See application file for complete search history.

(56) References Cited

U.S. PATENT DOCUMENTS

| 5,506,549 | A * | 4/1996 | Crutcher ......................... 333/18 |
| 7,324,588 | B2 * | 1/2008 | Green et al. ................... 375/224 |
| 7,536,167 | B2 * | 5/2009 | Gollnick et al. ........... 455/343.4 |
| 2008/0123756 | A1 | 5/2008 | Daniels et al. |
| 2008/0231281 | A1 | 9/2008 | Fain et al. |
| 2009/0028270 | A1 | 1/2009 | Chen |
| 2010/0182914 | A1 | 7/2010 | Delregno et al. |
| 2013/0182620 | A1 * | 7/2013 | Chaffee et al. ................. 370/310 |
| 2013/0345926 | A1 * | 12/2013 | Boulton et al. .............. 701/32.8 |

OTHER PUBLICATIONS

V. Erceg et al., "TGn Channel Models", IEEE P.802.11 Wireless LANs, May 10, 2004.
Anite, "User-friendly Emulator for MIMO Performance Testing—Propsim FS8 Radio Channel Emulator", 2013, Hampshire, UK.
Spirent, "Wireless Channel Emulator—VR5 HD Spatial Channel Emulator", 2013.
WIPO, International Search Report for PCT/US2014/017923, Jun. 23, 2014.

* cited by examiner

*Primary Examiner* — Michael Neff
(74) *Attorney, Agent, or Firm* — Intrinsic Law Corp.; Ibrahim M. Hallaj (57) ABSTRACT

A multipath channel emulation system and method are disclosed. In some aspects, the system and method allow for analog emulation of a multipath MIMO wireless channel. Such multipath channel emulation system is used for testing the ability of wireless communication devices to operate in an airlink channel characterized by multipath. In a particular aspect, an impedance mismatch or discontinuity is provided in an open-ended coaxial cable so as to cause multiple back and forth reflections between an impedance discontinuity and an open coaxial cable stub and, optionally, including a delay element to emulate a multi-cluster multipath environment. A plurality of such stub subsystems may be combined as subpaths in a multipath channel emulator.

17 Claims, 10 Drawing Sheets

RADIO FREQUENCY MULTIPATH CHANNEL EMULATION SYSTEM AND METHOD

RELATED APPLICATIONS

This application is related to and claims the benefit and priority of U.S. Provisional Application No. 61/768,165 entitled, "RF Based Channel Emulator System and Method" filed on Feb. 22, 2013, which is hereby incorporated by reference.

TECHNICAL FIELD

This invention relates to a radio frequency (RF) communication channel emulator, and more specifically to a RF multipath emulator as used in wireless communication system design and testing applications.

BACKGROUND

A channel emulator is a specialized piece of electronic test equipment that emulates propagation of radio-waves based on well-defined environmental conditions. Channel emulators have been available for many years. Examples include the Spirent VR5 and the Anite Propsim. A channel emulator can emulate a reproducible set of environmental conditions that allows the verification of radio performance, as well as comparative evaluation of different radios under identical (emulated) propagation conditions. Traditional channel emulators were designed for conventional radios, now referred to as single input single output (SISO) radios. A SISO channel emulator models a single fading channel between a transmitter and a receiver by emulating multipath and Doppler fading in a multitude of predefined environmental conditions described by channel models. Multipath is a phenomenon whereby a transmit signal reflects from multiple surfaces and arrives at the receiver in the form of a sum of multiple delayed versions of itself. Multiple versions of the same transmit signal add together either constructively or destructively, resulting in time-variable signal attenuation known as multipath fading. Multipath fading creates signal fluctuation vs. time and this fluctuation determines the channel's Power Delay Profile (PDP). Models of representative PDPs of fading channels (e.g. inside of a house or urban environment) are defined by industry standards, such as, for example, $3^{rd}$ Generation Partnership Project (3GPP) TR 25.996, "3rd Generation Partnership Project; technical specification group radio access networks; Spatial channel model for MIMO simulations", which is hereby incorporated by reference.

Figure 6:
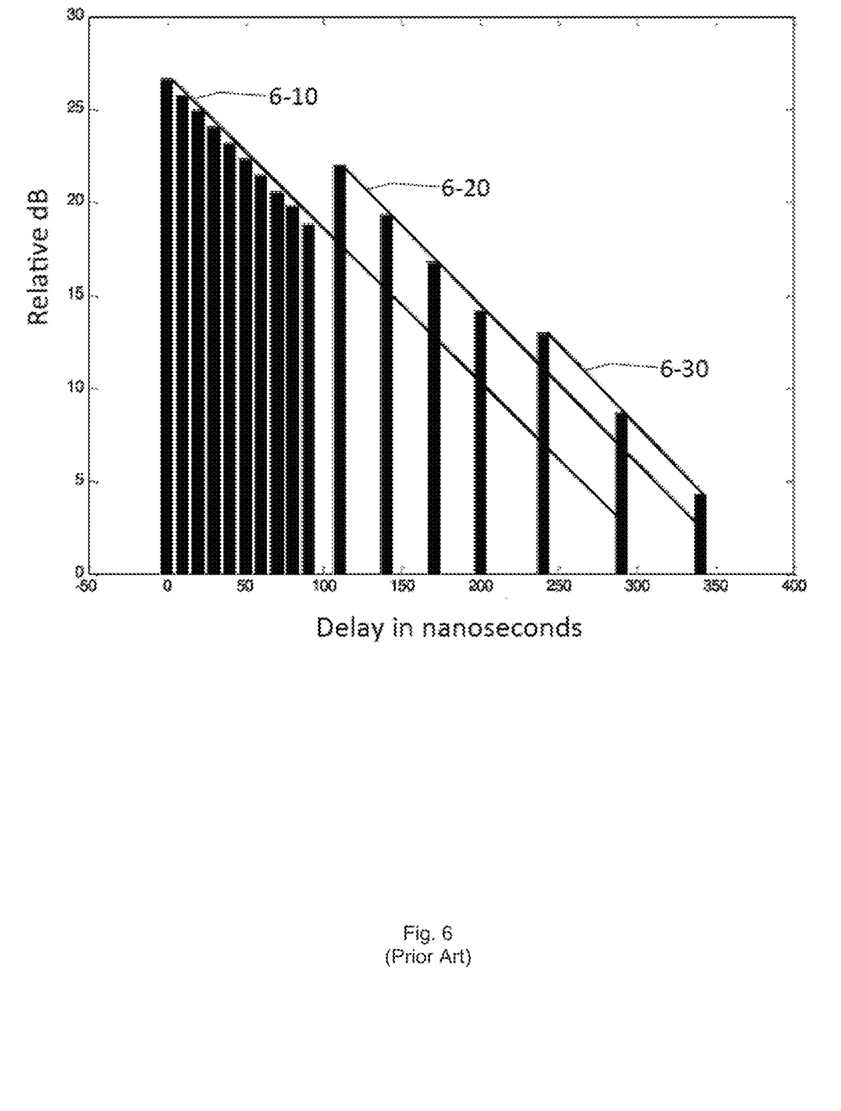
FIG. 6 is an example plot of a power delay profile (PDP) of clustered multipath channel model, 802.11n model D.

An example of a PDP plot (signal power vs. time) is shown in FIG. 6. Standards based channel models typically define PDPs as being composed of one or more reflection 'clusters'. A cluster can be a group of electromagnetic 'rays' reflected together from a surface such as, for example, a wall or a corner of a room. In a typical wireless channel, multiple such clusters separated in time combine to create a PDP, such as the PDP shown in the plot of FIG. 6.

The delay spread of multipath reflections is a function of the size of the physical environment being modeled. Delay spread is shorter for small spaces (e.g. a small office) and longer for large spaces (e.g. outdoor environments).

A typical channel emulator downconverts the RF signal transmitted by a device under test (DUT), digitizes this signal into a stream of in-phase and quadrature (IQ) samples and mathematically processes the digitized IQ streams according to a selected multipath and Doppler fading model. The resulting signal is then upconverted and coupled into the receiving device under test (DUT).

Figure 2:
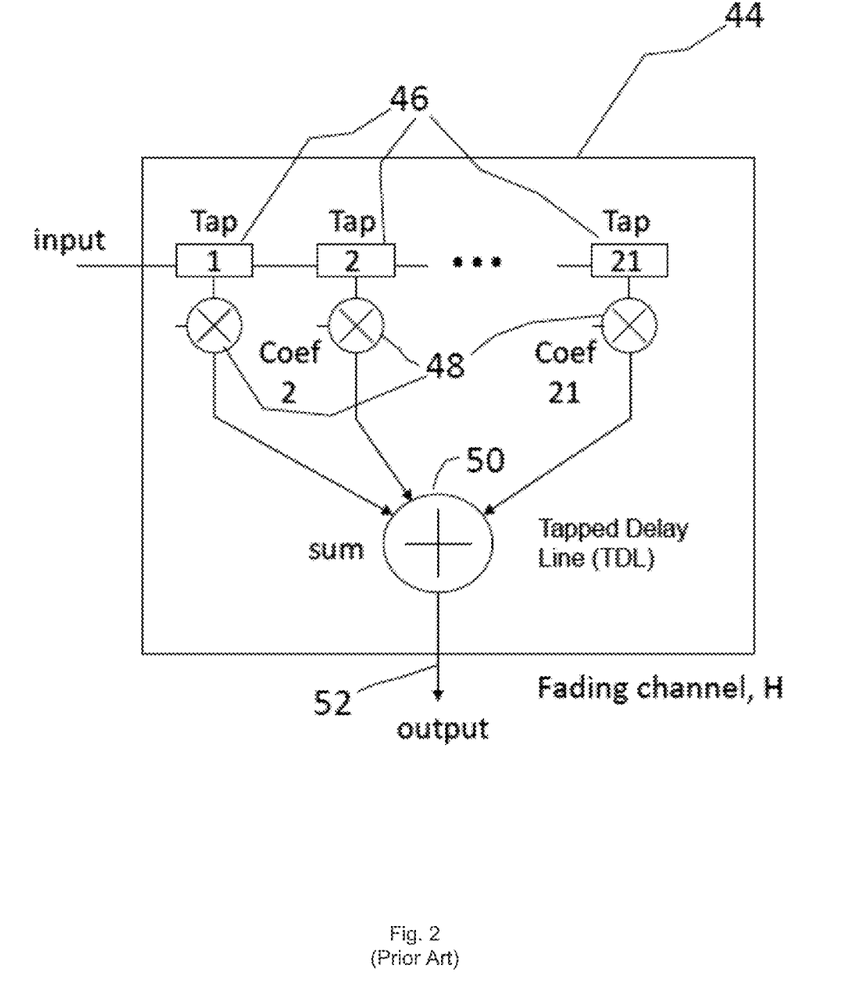
FIG. 2 is a block diagram of a prior art tapped delay line (TDL) based modeling of a fading channel, implemented using computational logic.

Modern 2-way data communications radios, such as IEEE 802.11n and 3GPP Long Term Evolution (LTE) radios, use Multiple Input Multiple Output (MIMO) technology. A MIMO radio is composed of multiple receive and transmit subsystems (chains) operating in phase lock and employing sophisticated radio transmission techniques to increase data throughput and operating range of wireless links. A MIMO link is typically described as an N×M link, where N is the number of transmit chains in a transmitting radio and M is the number of receive chains in the receiving radio. In a MIMO link signals from all N transmit chains couple into each of the M receive chains via correlated MIMO paths in an airlink (e.g. in a room). Therefore, a MIMO channel emulator must model N times M fading channels (as compared to a SISO emulator that models only one fading channel). In prior art channel emulators each fading channel is typically implemented as a tapped delay line (TDL) structure, as shown in FIG. 2. Channel models specifying the time-variable tap coefficients for the TDL multipliers and correlation of these coefficients are defined by industry standards being developed by organizations, including IEEE and 3GPP. Channel models can also be defined by end users or recorded for real environments using channel sounding techniques.

Figure 3:
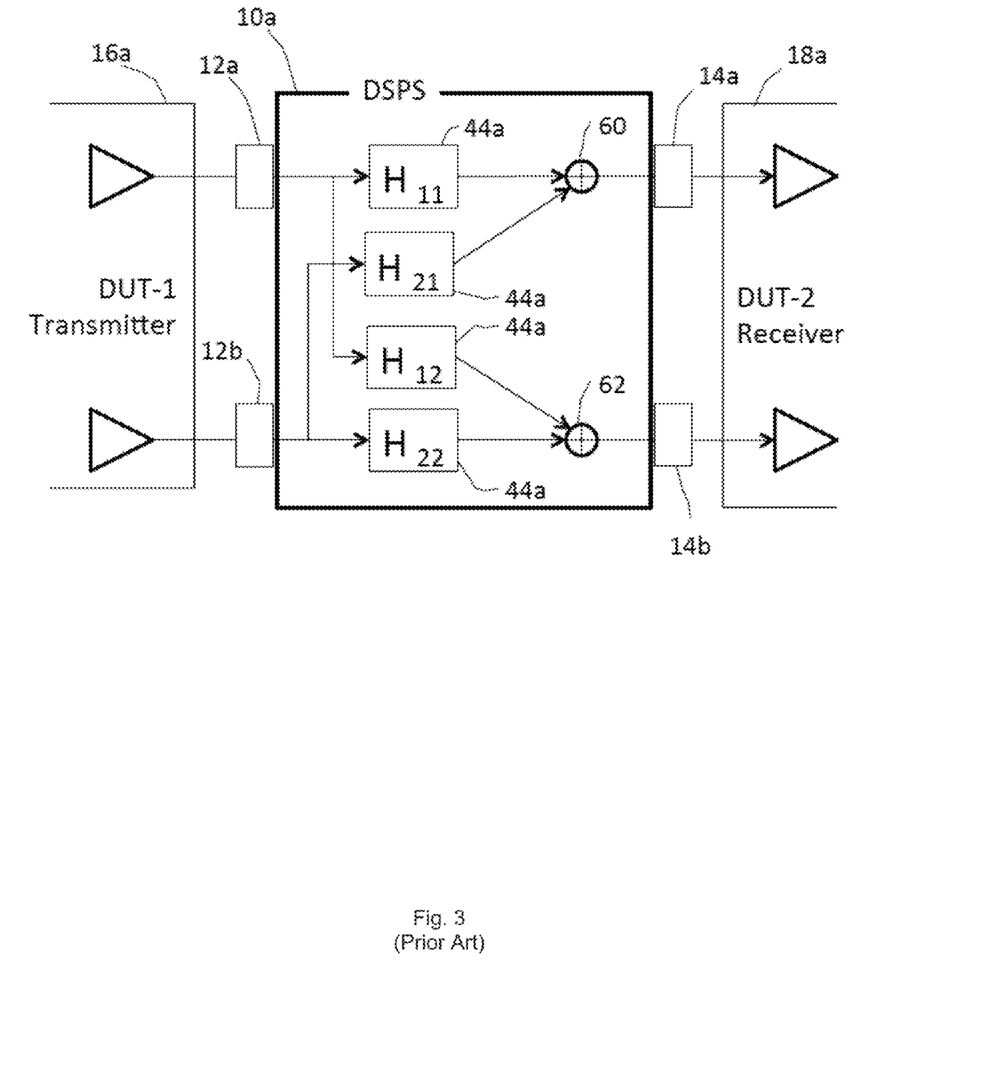
FIG. 3 is a block diagram of a prior art unidirectional 2×2 MIMO channel emulator with four fading channels.
Figure 4:
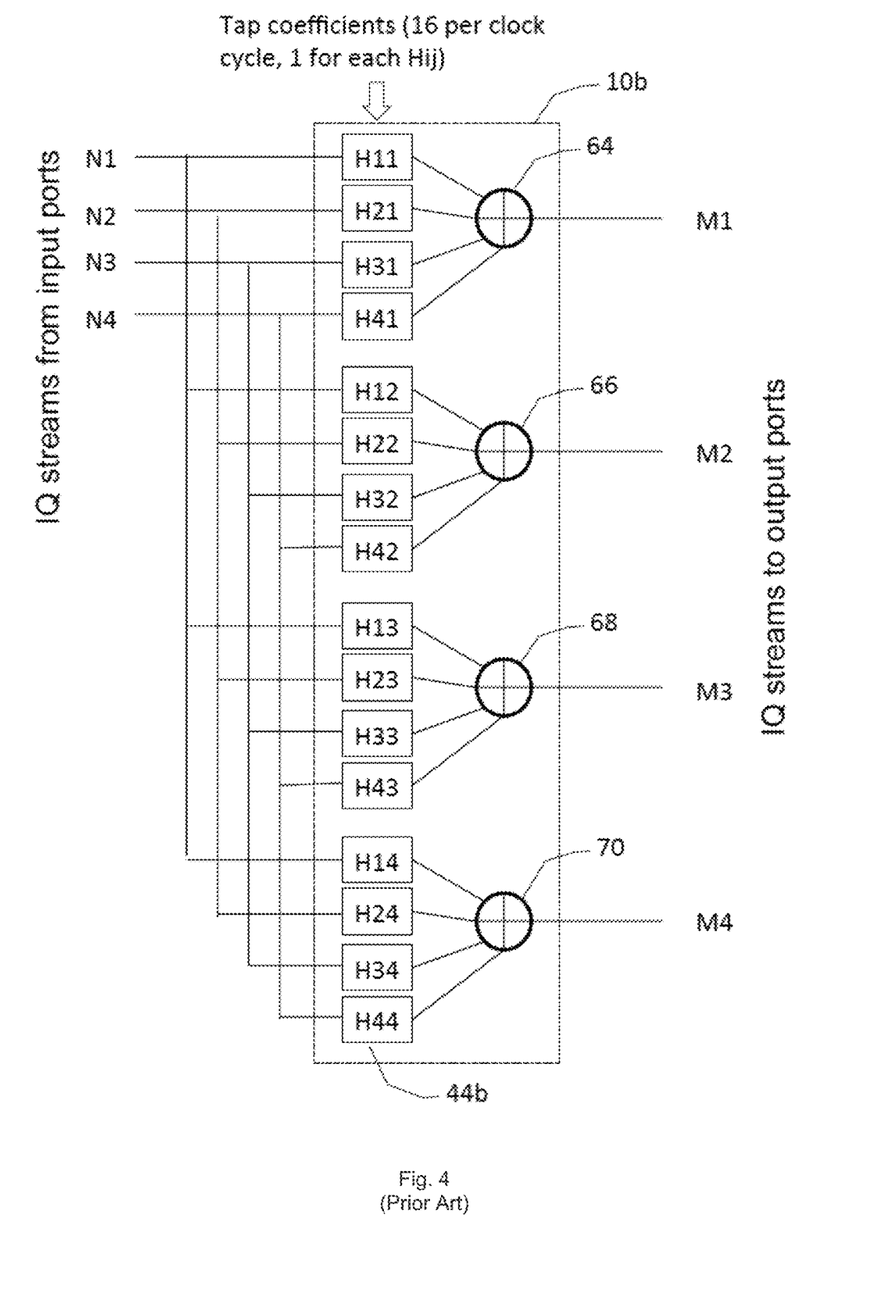
FIG. 4 is a block diagram of a prior art DSPS of a 4×4 MIMO channel emulator with sixteen fading channels.

In prior art channel emulator implementations the number of fading channels grows exponentially with the number of ports. For example a 2×2 MIMO channel emulator has 4 fading channels, $H_{ij}$, as shown in FIG. 3. A 4×4 MIMO channel emulator has 16 fading channels, $H_{ij}$, as shown in FIG. 4.

Figure 5:
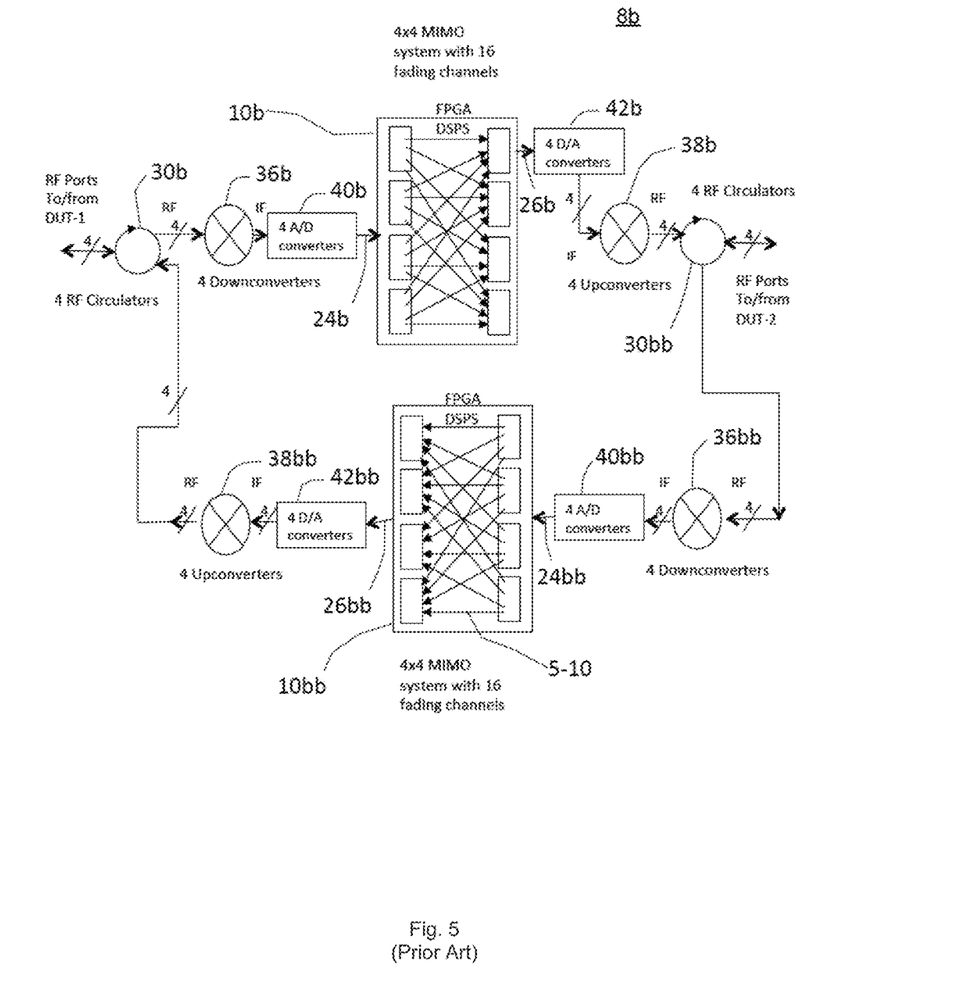
FIG. 5 is a block diagram of a prior art bi-directional 4×4 MIMO channel emulator with centralized FPGA based DSPS and RF subsystems emulating forward and reverse signal propagation.

A unidirectional MIMO channel emulator for an N×M MIMO system has N receive and M transmit ports. The transmitting DUT connects to the N receive (input) ports of the channel emulator and a receiving DUT connects to the M transmit (output) ports of the channel emulator. If the channel being modeled is bidirectional, a channel emulator typically duplicates the circuitry in the forward and reverse directions to accommodate 2-way transmission between the DUTs, as shown in FIG. 5. The DUT RF ports, which for normal operation connect to antennas, are typically bidirectional. Thus, RF circulators or diplex filters must be used to separate transmit from receive signals for coupling to the channel emulator input and output ports, as shown in FIG. 5. Circulators are used when DUTs use the same frequency for transmitting and receiving, as do, for example, Wi-Fi or TDD (time division duplex) DUTs. Diplex filters can be used to separate RX from TX signals when DUTs use different transmit and receive frequencies, as do, for example, FDD (frequency division duplex) DUTs.

Figure 1:
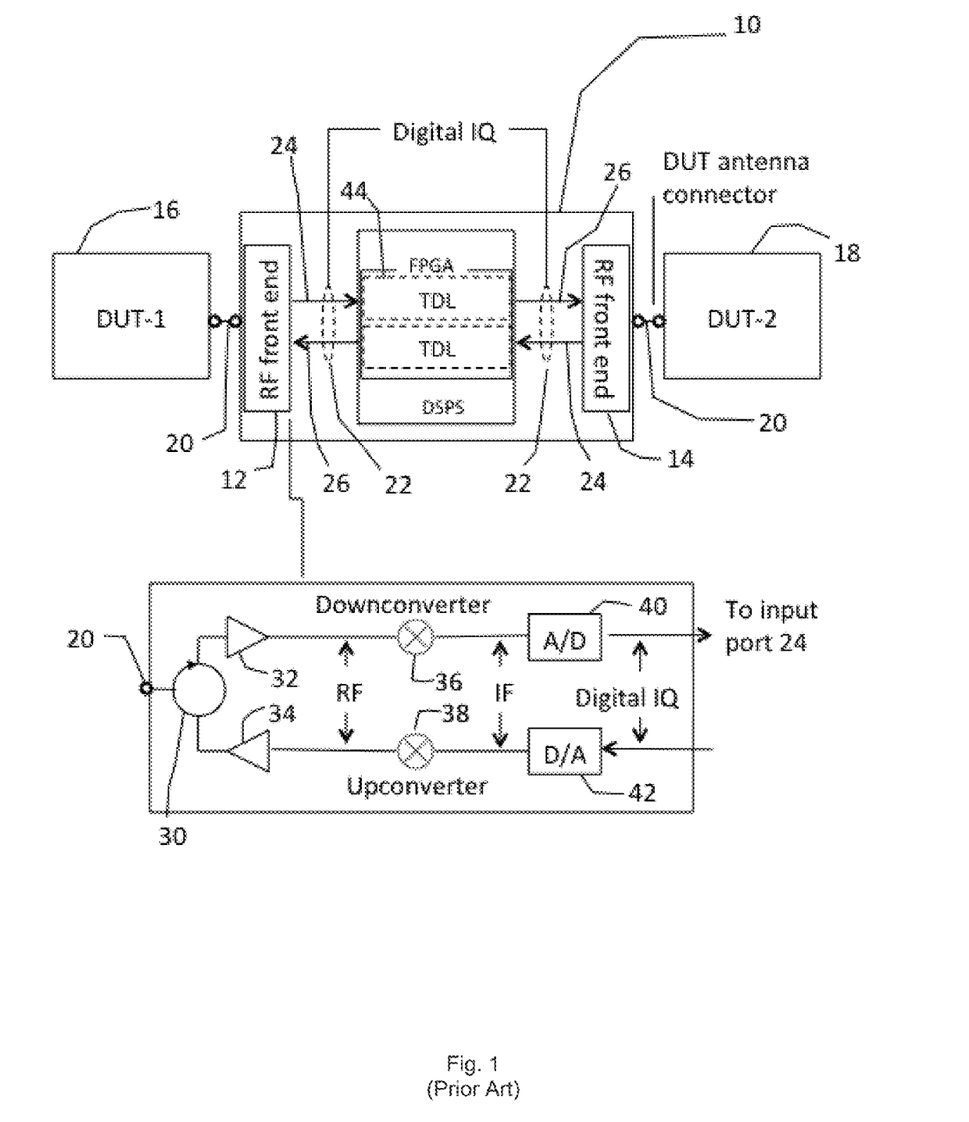
FIG. 1 is a block diagram of a prior art channel emulator with an exploded detail of an RF front end.

Prior art channel emulators incorporate RF front end and a Digital Signal Processing Subsystem (DSPS), as shown in FIG. 1. Prior art implementations cost hundreds of thousands of dollars because they implement a full mesh of fading channels: from each input port of a channel emulator to each output port. Thus, the complexity and cost of the DSPS computational hardware increases exponentially with the number of ports.

In prior art implementations, for each MIMO input the RF signal is downconverted to baseband and then digitized to produce IQ sample streams. Then channel models are applied computationally to the IQ streams in real-time by the DSPS.

In modern MIMO channel emulator implementations, DSPS computing logic incorporates thousands of complex 16-bit multipliers operating at clock speeds of up to 400 MHz and typically implemented in FPGAs (field programmable gate arrays).

Each TDL that implements a fading channel is comprised of complex multipliers, as shown in FIG. 2. A 4×4 MIMO channel emulator has 16 fading channels and each fading channel is implemented by a TDL. Each tap in a TDL is a complex multiplier requiring 4 hardware multipliers.

To model a 40 MHz wireless channel, as for example is required for 802.11n systems, the IEEE 802.11 specification for channel modeling, "IEEE 802.11-03/940r4, TGn Channel Models" document, which is hereby incorporated by reference, requires up to 18 taps per TDL. To model an 80 MHz channel, as for example is required for 802.11ac channel emulation per "IEEE 802.11-09/030r10, TGac Channel Model Addendum" document, which is hereby incorporated by reference, the number of taps per TDL and hence the number of complex multipliers is up to 35 per TDL. For 802.11ac systems using 160 MHz RF channel, the number of taps up to 69. To implement an 802.11ac 8×8 channel emulator, the number of fading channels, H, is 8*8=64. The number of taps per fading channel (per TDL) for 160 MHz wide channel is 69. Thus, the number of complex multipliers required to implement a DSPS of an 8×8 MIMO 802.11ac channel emulator supporting 160 MHz wide channel is 64 paths*69 taps per path=4416. And each complex multiplier is comprised of 4 hardware multipliers. Thus the total number of multipliers operating simultaneously and clocked by a 400 MHz clock is 4416*4=17,664. For a bi-directional implementations the number of multipliers is doubled for implementing each direction of the signal flow, requiring 17,664*2=35,328 multipliers. Implementing such a DSPS would require multiple state-of-the art power-hungry FPGAs performing 35,328 simultaneous multiplications at the rate of 400 MHz. With today's FPGA technology, this computational requirement borders on infeasible. And, as indicated above, the number of such computationally intensive fading channels implemented in a DSPS increases exponentially with the number of channel emulator ports. Channel emulators for future MIMO systems of higher order than 8×8 will be extremely challenging to implement using prior art computational techniques since the required number of multipliers grows exponentially with the number of channel emulator ports.

Analog or RF based channel emulation implementations, such as the invention described in this disclosure, are considerably more practical and economical.

At the output of a prior art DSPS, digital IQ streams, which have multipath computationally applied to them by the DSPS, are converted to analog using D/A converters and then the analog IQ signals are upconverted to RF carrier frequency, creating the RF output from the channel emulator to the receiving DUT, as shown in FIG. 1 and in FIG. 5.

The reference to prior art, documents and other things known to those skilled in the art is not intended by way of likeness or differentiation from the present inventions, but is rather mentioned as an aid to those of interest and skill in the art to set a context for the inventions. Any such documents and things are hereby incorporated by reference.

SUMMARY

In accordance with various aspects of the subject of this invention, in at least one embodiment, the invention presents inexpensive channel emulation system that makes use of off-the-shelf RF coaxial cables, RF splitters, RF attenuators and other such components and does not require computationally intensive DSPS.

RF components can be arranged and tuned so as to implement standards-based PDPs of standards based channel models without any computational logic of prior art implementations.

Without the need for an expensive DSPS, up- and down-conversion of prior art systems, and with simplified RF circuitry, an RF based channel emulator according to at least one aspect of this invention costs less than a tenth of what a comparable prior art DSPS based channel emulator costs to build.

According to one aspect of this invention, RF coaxial cable stubs are used to implement a key subset of the functionality of a prior art DSPS, namely modeling of multipath reflections of common wireless channels.

An RF based channel emulator according one aspect of this disclosure can emulate distance and motion of the radios by cascading a programmable RF attenuator with the RF circuitry used to emulate multipath reflections. A programmable RF attenuator can emulate time-variable path loss, thus emulating motion of the DUTs.

As was discussed above, one reason for the high cost of prior art implementations is the exponential increase in the size and complexity of DSPS vs. number of ports in a channel emulator. This exponential increase is the result of implementing a full mesh of fading channels (paths) interconnecting all input ports of a channel emulator to all output ports, with each fading channel being modeled by a TDL composed of complex high resolution multipliers.

Implementing a full mesh of fading channel paths is necessary for prior art channel emulators that implement conducted interconnections to the DUT antenna ports. Conducted interconnections means that antennas are removed from the DUTs and channel emulator RF ports are connected to the DUTs' antenna ports using RF coaxial cabling, as shown in FIG. 1 and in FIG. 5.

Figure 9:
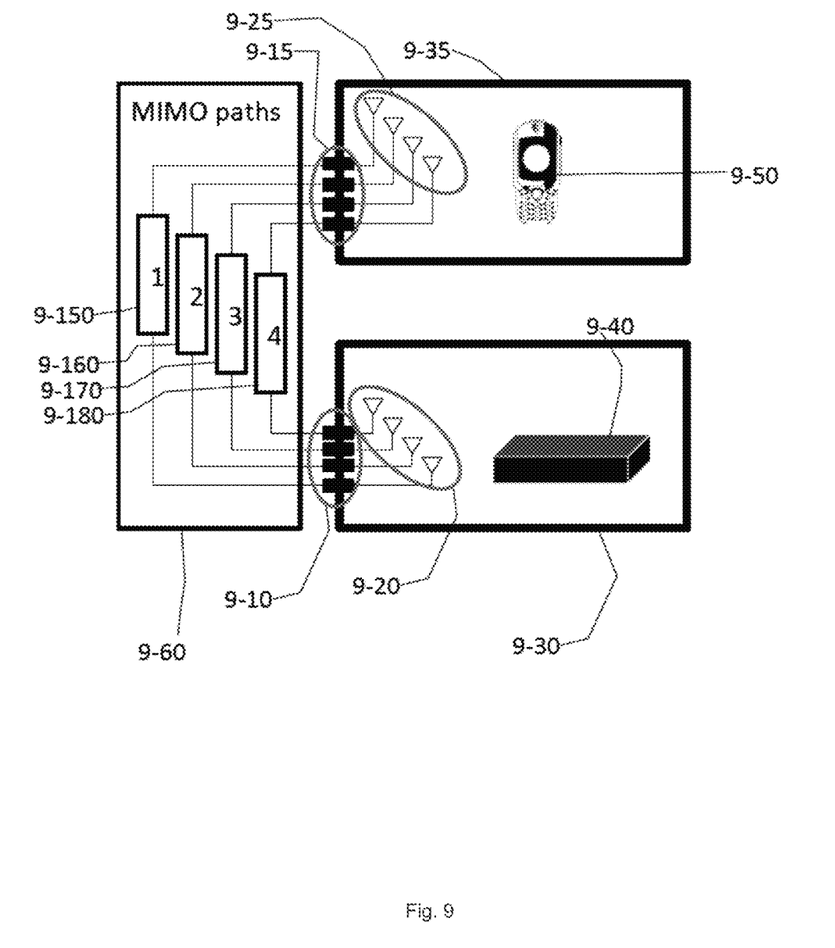
FIG. 9 illustrates an exemplary 4×4 RF based channel emulator according to one embodiment of this invention used in a MIMO-OTA (over-the-air) wireless testbed.

However, when an RF testbed uses over-the-air (OTA) coupling between a channel emulator and the DUTs, as shown in FIG. 9, MIMO propagation paths are naturally created, with MIMO channel correlation based on test antenna spacing, thus resulting in real OTA paths from any port to any other port. Thus, OTA testbeds can be constructed using a combination of simple RF-based reflectors and OTA coupling via MIMO antennas without the expensive computational logic modeling each fading channel in a full mesh of MIMO paths.

Therefore, one or more embodiments are directed to a radio frequency (RF) channel emulator comprising at least one RF multipath subsystem; each said RF multipath subsystem comprising at least one sub-path; and each said sub-path comprising an impedance discontinuity and an RF cable stub.

One or more embodiments are also directed to a method for emulating a multipath transmission channel comprising an RF sub-path, introducing an impedance discontinuity in series with an RF cable stub of said RF sub-path; introducing a signal into said RF cable; and causing multiple reflections between said impedance discontinuity and an open end of said RF cable stub so as to emulate a multipath channel.

IN THE DRAWINGS

Other objects, features and advantages will occur to those skilled in the art from the following description of a preferred embodiment and the accompanying drawings, in which.

DETAILED DESCRIPTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively absent an affirmative exclusion, restriction, or disclaimer.

A preferred embodiment of the invention reduces the cost of MIMO channel emulators by modeling radio propagation reflections in some common wireless channels (e.g. inside a typical house) using inexpensive RF hardware rather than conventional DSPS based prior art channel emulator architecture shown in FIG. 1 and in FIG. 5.

Radio signals subject to multipath in a typical wireless channel environment can be modeled as a series of attenuated, time-delayed, phase-shifted replicas of the transmitted signal using the expression:

$$h_b(t, \tau) = \sum_{i=0}^{N-1} a_i(t, \tau) \exp[j(2\pi f_c \tau_i(t) + \phi_i(t, \tau))] \delta(\tau - \tau_i(t))$$

where $\alpha_i(t,\tau)$, $\tau_i(t)$ and $2\pi f_c \tau_i(t)+\phi_i(t, \tau)$ represent the real amplitude, delay, and phase shift of the ith multipath component at time t, N is the total number of multipath taps and $\delta(\cdot)$ is the unit impulse function. A common method to replicate the channel impulse response (CIR) in a channel emulator is the use of filtered noise to generate random processes for $\alpha_i(t,\tau)$ and a tapped delay line (TDL) to provide the sum across multipath constituents. The number of taps then necessary to capture all or most of the signal energy depends on the delay spread.

FIG. 1 illustrates a conventional bidirectional channel emulator arrangement including DSPS 10 with RF front ends 12 and 14 servicing the devices under test, (DUTs) DUT-1 16 and DUT-2 18. DUT-1 16 connects to DSPS 10 either via its RF antenna connector 20 through the RF front end 12 or directly into the digital IQ bus 22 of DSPS subsystem 10. A stream of IQ samples from the RF receiver in the RF front end arrives at the input port 24 of DSPS 10. A stream of IQ samples to the RF transmitter in the RF front end 14 arrives via output port 26. A typical RF front end 12, 14 shown exploded in FIG. 1 may include a circulator 30 with low noise amplifier (LNA) 32 and power amplifier (PA) 34 and downconverter 36 and upconverter 38 mixers where the RF/IF transformations are accomplished. An analog to digital converter 40 converts the analog IF signal to digital for delivery to input port 24. Digital to analog converter 42 converts the digital signal from output port 26 to analog for delivery to upconverter mixer 38. Typically DSPS 10 includes one or more tapped delay lines (TDLs) 44 typically implemented using FPGAs.

A typical tapped delay line (TDL), FIG. 2, 44 includes a plurality of taps 46 each of which has associated with it a multiplier 48 for applying time varying coefficients, the products of which are combined in summer 50 to provide the TDL output 52. The multipliers 48 are complex multipliers operating on complex IQ data and complex time variable coefficients.

A typical 2×2 multiple input multiple output (MIMO) channel emulator DSPS 10a, FIG. 3, includes four TDLs 44a implementing four correlated fading channels. Each fading channel TDL 44a is modeled using tapped delay lines $H_{11}$, $H_{12}$, $H_{21}$, $H_{22}$, with time varying and spatially correlated coefficients. The outputs of fading channels 44a TDLs $H_{11}$ and $H_{21}$ are combined in summer 60 and the outputs of fading channels 44a TDLs $H_{12}$, and $H_{22}$ are combined in summer 62.

A 4×4 MIMO channel emulator DSPS 10b with sixteen correlated fading channels is shown in FIG. 4 with four input MIMO streams of IQ samples at N1-N4 distributed to sixteen fading channels, TDLs 44b, designated: $H_{11}$, $H_{21}$, $H_{31}$, $H_{41}$ which are combined in summer 64; $H_{12}$, $H_{22}$, $H_{32}$, $H_{42}$, combined in summer 66; $H_{13}$, $H_{23}$, $H_{33}$, $H_{43}$, combined in summer 68; and $H_{14}$, $H_{24}$, $H_{34}$, $H_{44}$, combined in summer 70 to provide four output MIMO streams of IQ samples M1-M4.

A prior art bi-directional implementation of a typical 4×4 MIMO channel emulator system 8b, FIG. 5, duplicates the DSPS and RF subsystems to emulate forward and reverse signal propagation. Thus there are two channel emulator DSPS 10b, 10bb to implement the 4×4 MIMO paths with sixteen fading channels 5-10 in each direction. DSPS 10b has associated with it four D/A converters 42b, four upconverters 38b, four A/D converters 40b, four downconverters 36b. Likewise DSPS 10bb has associated with it four upconverters 38bb, four ND converters 40bb, four D/A converters 42bb and four downconverters 36bb. There are four RF circulators each 30b and 30bb which are shared by both DSPS 10b and 10bb.

FIG. 6 illustrates a power delay profile (PDP) plot of 802.11n model D. PDP of model D consists of 3 clusters of radio signal reflections 6-10, 6-20 and 6-30. Cluster 6-10 models a radio signal that bounces back and forth between two reflective surfaces with the power exponentially decaying with each bounce. The energy of the bouncing cluster decreases linearly on a logarithmic (dB) scale (y-axis of the plot). Cluster 6-20 bounces between two reflective surfaces that are spread farther apart and hence the reflections representing cluster 6-20 are spaced wider apart than the reflections of cluster 6-10 on the time scale (x-axis of the plot).

Reflections in cluster 6-30 are spread even wider apart, signifying that cluster 6-30 bounces between two surfaces wider apart than clusters 6-10 and 6-20. Such clustered reflections with several clusters overlapping in time are defined by standards based channel models and implemented in prior art channel emulators using tapped delay lines as shown in FIG. 2 inside a DSPS as shown in FIG. 3 and in FIG. 4.

Figure 7:
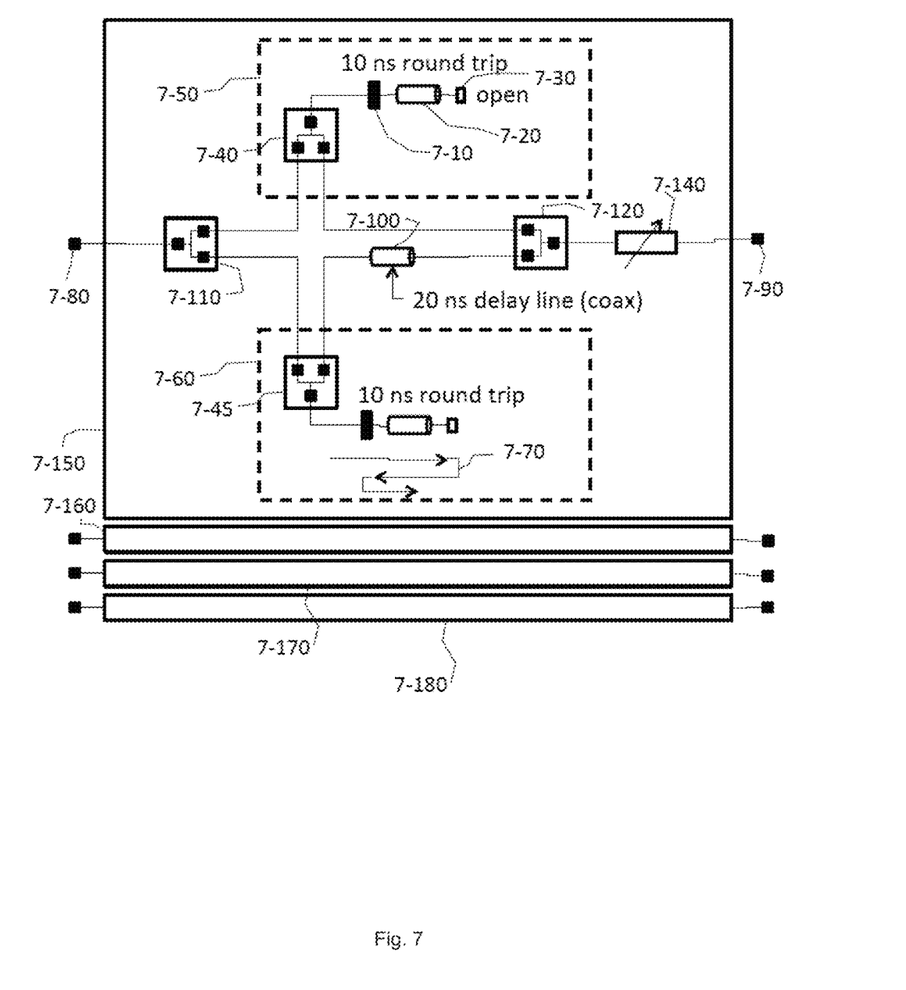
FIG. 7 is a block diagram of a bi-directional 4×4 MIMO channel emulator system according to one embodiment of this invention.

Replacing the complex and expensive DSPS subsystem of prior art channel emulators, this invention implements clusters of multipath reflections using RF cable stubs 7-20, as shown in FIG. 7. RF Multipath Subsystems (RFMS) 7-150, 7-160, 7-170 and 7-180 emulate RF paths having one or more sub-paths 7-50 and 7-60 that model multipath clusters. These RFMSs can have identical design or may use different delay and reflection magnitude parameters for emulating the clusters and may emulate one or more clusters. In FIG. 7, an exemplary RFMS 7-150 is shown in detail. The other RFMS modules 7-160, 7-170 and 7-180 may have the same construction as module 7-150 or may be constructed differently. For example RFMS may comprise a plurality of sub-paths, such as 7-50 and 7-60. Each of the sub-paths 7-50, 7-60 will emulate a single cluster, such as each of the three clusters of FIG. 6. RFMS 7-150 includes 2 sub-paths 7-50 and 7-60 that comprise the main signal path through RFMS 7-150 having an input at 7-80 and an output at 7-90. Each of the sub-paths emulates airlink reflectors causing the RF signal to bounce back and forth, thus forming a cluster. FIG. 7 shows four RFMS based paths 7-150, 7-160, 7-170 and 7-180 that can be used as a system to implement a 4×4 MIMO channel emulator. Sub-path 7-50 includes an impedance discontinuity 7-10 connected to an unterminated (open) stub of RF coaxial cable 7-20. RF signal propagating down stub 7-20 reflects back and forth between the open end of the cable 7-30 and the discontinuity 7-10. This mode of signal reflection bouncing is conceptually represented by the arrows 7-70. Sub-paths modeling the two clusters in this embodiment of the invention are cabled via RF splitters 7-40 and 7-45 into the main signal path between RF ports 7-80 and 7-90.

RF ports 7-80 and 7-90 provide a path for signal coupling between two DUTs (devices under test), as will be explained below. Such signal coupling may be implemented wirelessly over the air (OTA) or conductively via connection to DUT antenna ports. In one example, the signal lines in the RFMS 7-150 are bi-directional 50 ohm transmission lines and thus RF ports 7-80 and 7-90 can be connected between the antenna ports of two DUTs without the use of circulators or diplex filters as required for prior art implementations, such as shown in FIG. 5. In one aspect, having bi-directional RF signal paths, as described herein, eliminates the need to duplicate RF and DSPS circuitry, as shown in FIG. 5, to emulate multipath fading in both directions between DUTs.

The 50 ohm transmission line between RF ports 7-80 and 7-90 splits the signal into the two sub-paths 7-50 and 7-60 via RF splitters 7-110 and 7-120. Sub-path 7-60 is delayed with respect to sub-path 7-50 by a delay line 7-100. Delay line 7-100 may be implemented as a coaxial cable, LC delay line or a fiber optic cable delay line, or using other methods recognized by those skilled in the art. Delay line 7-100 may be inserted in series with at least one of the sub-paths. The RF splitter 7-120 combines the signal from sub-path 7-50 with the signal from sub-path 7-60.

Programmable RF attenuator 7-140, modeling path loss in a wireless channel, can optionally be connected in series with at least one sub-path or in series with the overall path between RF ports 7-80 and 7-90 as shown in FIG. 7. Time-variable path loss can be implemented to model motion of the DUTs connected to RF ports 7-80 and 7-90 by changing the setting of the attenuator 7-140 as a function of time. Those skilled in the art would understand that alternative implementations are also possible. For example, the length of cable stub 7-20 may be variable so as to achieve a desired cluster behavior. In yet another embodiment, cable stub 7-20 may be replaced by a programmable delay line so as to achieve programmable cluster modeling.

Figure 8:
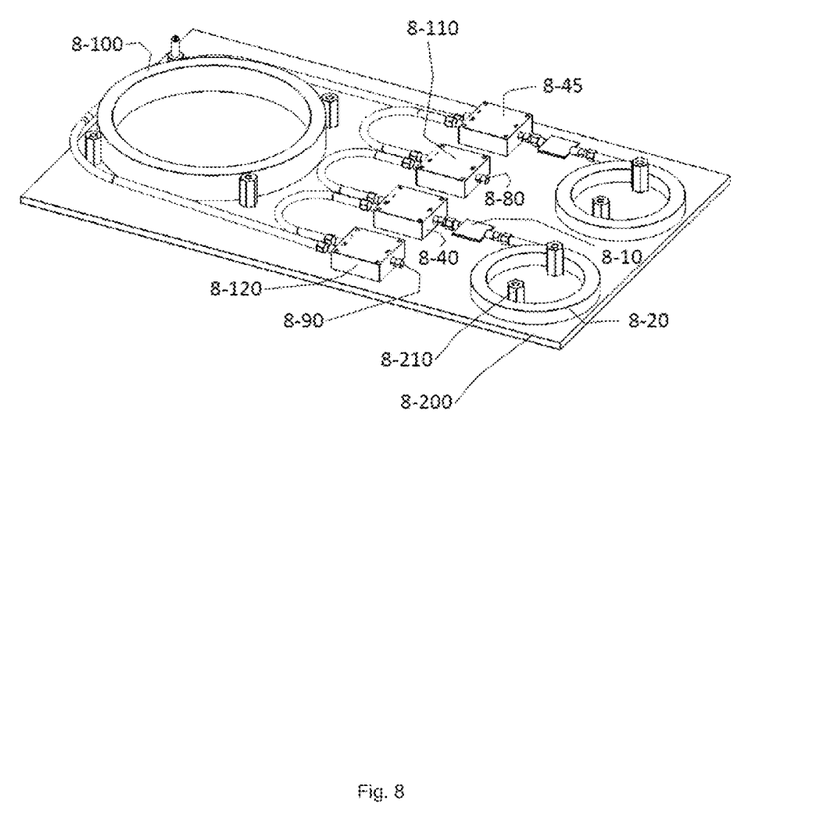
FIG. 8 illustrates an exemplary RF multipath emulator subsystem (RFMS) of an RF based channel emulator according to one embodiment of this invention.

FIG. 8 shows the construction of an RFMS, such as 7-150, 7-160, 7-170 or 7-180 shown in FIG. 7. The RFMS components can be mounted on a board 8-200 with sections of cabling, for example 8-20 and 8-100, secured using stand-offs 8-210. The 50 ohm signal path between RF ports 8-80 and 8-90 corresponds to the signal path between RF ports 7-80 and 7-90 in FIG. 7. RF splitter 8-40 connected to the cable stub 8-20 via discontinuity 8-10 corresponding to cluster sub-path 7-50 in FIG. 7.

FIG. 9 illustrates an exemplary 4×4 wireless MIMO-OTA (over-the-air) testbed. DUTs 9-40 and 9-50 are placed inside small anechoic RF isolation chambers 9-30 and 9-35 respectively. A MIMO link is formed between DUTs 9-40 and 9-50 via RFMSs 9-150, 9-160, 9-170 and 9-180. The coupling between DUTs 9-40 and 9-50 occurs via respective groups of antennas 9-20 and 9-25 in chambers 9-30 and 9-35. The test antennas 9-20 and 9-25 are connected to the RF ports of RFMSs via groups of RF barrel connectors 9-10 and 9-15. Each antenna group 9-20 and 9-25 may comprise 4 separate antenna elements to emulate a 4×4 MIMO channel, but this may be generalized, as discussed above, to other configurations. Those skilled in the art would appreciate that numerous configurations for antenna groups 9-20 and 9-25 as well as different designs of individual antenna elements within the groups are possible. Additionally, the spacing and arrangement of the individual antenna elements within the antenna groups may be configured to achieve the desired channel emulation results.

Anechoic chambers 9-30 and 9-35 create controlled RF environment for DUTs 9-40 and 9-50 and isolate the DUTs and antennas 9-20 and 9-25 from external interference. Likewise, the RFMSs are placed into a shielded enclosure 9-60 to protect the testbed against RF interference. Absorber foam is attached to the metal walls of chambers 9-30 and 9-35 to create anechoic (non-echoing) environment inside chambers 9-30 and 9-35. The absorber foam dampens reflections from the metal walls of the chambers so multipath parameters, such as cluster delays and reflection magnitudes, are controlled mainly by the RFMSs 9-150, 9-160, 9-170 and 9-180 and not impacted by unintended signal reflections inside chambers 9-30 and 9-35. One skilled in the art can appreciate that, although a 4×4 MIMO configuration is shown in FIG. 9, the number of RFMSs and test antennas can vary based on the desired N×M configurations of RF MIMO channel being emulated in the testbed. RF test transmissions are coupled to and from the RFMSs via the test antennas 9-20 and 9-25 located inside the anechoic chambers. RF barrel connectors 9-10 and 9-15 can be N-type, SMA or other types of RF connectors that couple through the metal walls of the anechoic chambers. It should be understood that cross-coupling among the various MIMO sub-paths occurs in the air by way of interactions among the antenna elements within antenna groups 9-20 and 9-25.

Antennas 9-20 or 9-25 can also be replaced by conducted connections to the DUT antenna ports. DUT antennas would be removed for such conducted connections to be made.

Those skilled in the art will appreciate that the arrangement shown in FIG. 9 is only exemplary. In practice, the components may be arranged and distributed in separate RF isolation chambers or in compartments within the same chamber or other configurations.

Figure 10:
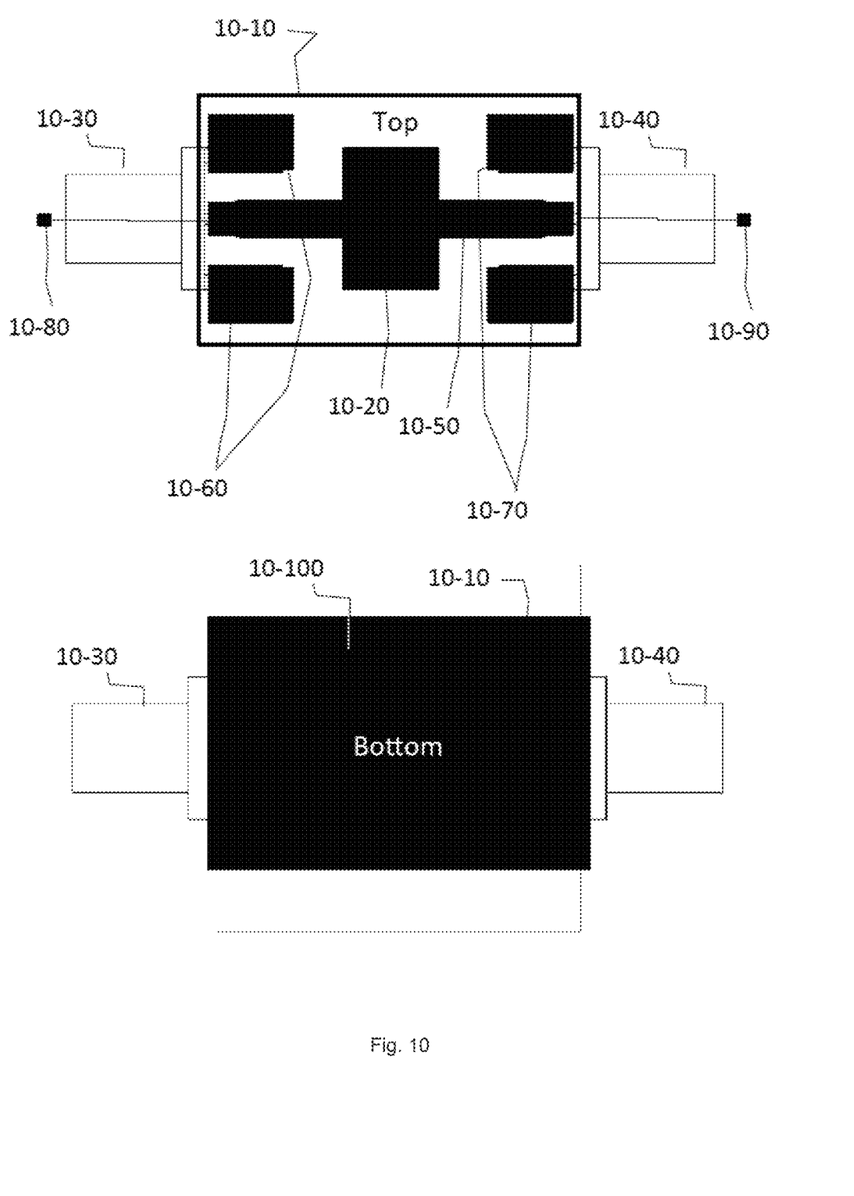
FIG. 10 illustrates an exemplary PC board implementation of a discontinuity used by the RFMS to emulate multipath reflections according to one embodiment of this invention.

FIG. 10 illustrates an exemplary circuit board 10-10 used to provide the impedance discontinuity described above. The discontinuity, implemented by traces on the PC board 10-10, corresponds to discontinuity 8-10 in FIG. 8 and to discontinuity 7-10 in FIG. 7. The purpose of the discontinuity is to cause signal reflections as shown in FIG. 7 diagram 7-70. The reflections are caused by impedance mismatch 10-20 on the 50 ohm transmission line formed by copper trace 10-50 on the top side of the PC board 10-10 and ground plane 10-100 on the bottom side of the PC board 10-10. The 50 ohm transmission line interconnects RF connectors 10-30 and 10-40. The copper segment 10-20, which is wider than the 50 ohm trace 10-50, is not 50 ohm and thus introduces impedance discontinuity in the 50 ohm transmission line between connector 10-30 and connector 10-40. Copper segments 10-60 are connected to the ground of RF connector 10-30. Copper segments 10-70 are connected to the ground of RF connector 10-40. The transmission line is formed by the trace connecting the center conductor 10-80 of RF connector 10-30 and the center conductor of connector 10-40 routed over the ground plane 10-100 on the bottom side of the PC board. The ground pads 10-60 of connector 10-30 and ground pads 10-70 of connector 10-90 are also electrically connected to the ground plane 10-100. The use of copper in the above description is only one way to implement the described embodiment. Other variations, using different conducting materials and metals (e.g., aluminum) would be understood by those skilled in the art.

In this description, numerous specific details are set forth. However, the embodiments/cases of the invention may be practiced without some of these specific details. In other instances, well-known hardware, materials, structures and techniques have not been shown in detail to aid the understanding of the present inventions. Also, the illustrated embodiments/cases are not mutually exclusive, unless so stated and except as will be readily apparent to those of ordinary skill in the art. Thus, the invention may include any variety of combinations and/or integrations of the features of the embodiments/cases described herein. Furthermore, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A radio frequency (RF) channel emulator, comprising:
at least one RF multipath subsystem configured to propagate an RF signal that emulates reflections of a transmitted wireless RF signal, such reflections forming a sum of multiple delayed versions of said transmitted signal;
each said RF multipath subsystem comprising at least one sub-path; and
each said sub-path comprising an impedance discontinuity and an RF cable stub configured to cause said propagated RF signal to bounce back and forth between said impedance discontinuity and an open end of said stub to emulate a multipath cluster.

2. The emulator of claim 1, further comprising a delay line disposed in series with at least one of said sub-paths.

3. The emulator of claim 1, further comprising an RF attenuator disposed in series with at least one of the sub-paths.

4. The emulator of claim 3, said attenuator comprising a variable attenuator.

5. The emulator of claim 1, said impedance discontinuity comprising an impedance mismatch disposed in series with said RF cable stub.

6. The emulator of claim 1, further comprising a first RF port for coupling said RF multipath system to a first radio and a second RF port for coupling said RF multipath system to a second radio, said RF multipath system providing an RF signal path between said first and second ports.

7. The emulator of claim 6, further comprising a first RF splitter disposed in series with said first port and a second RF splitter disposed in series with said second port.

8. The emulator of claim 6, further comprising an RF attenuator disposed in series with said RF signal path.

9. The emulator of claim 1, wherein said at least one RF multipath subsystem comprises:
a first sub-path comprising said impedance discontinuity and said RF cable stub; and a second sub-path comprising a second impedance discontinuity and a second RF cable stub.

10. The emulator of claim 9, further comprising a first RF splitter that couples a first terminal of the RF multipath sub-system to the first and second sub-paths.

11. The emulator of claim 9, further comprising an RF splitter that couples a second terminal of the RF multipath sub-system to the first sub-path and to a delay line disposed in series with the second sub-path.

12. The emulator of claim 11, further comprising an attenuator disposed in series with said second terminal of the RF multipath sub-system.

13. A method for emulating a multipath transmission channel comprising:
   in at least one radio frequency (RF) multipath subsystem, forming a sub-path comprising an impedance discontinuity in series with an RF cable stub;
   introducing an RF signal into said RF multipath sub-system, said introduced RF signal emulating reflections of a transmitted wireless RF signal, such reflections forming a sum of multiple delayed versions of said transmitted signal; and
   causing said introduced RF signal to bounce back and forth between said impedance discontinuity and an open end of said RF cable stub so as to emulate a multipath channel.

14. The method of claim 13, further comprising introducing a delay line in series with said sub-path.

15. The method of claim 13, further comprising disposing a RF attenuator in series with said sub-path.

16. The method of claim 15, disposing said RF attenuator comprising disposing a variable RF attenuator in series with said sub-path.

17. The method of claim 13, further comprising coupling said sub-path to at least one other such sub-path so as to emulate a multi-cluster multipath channel.

\* \* \* \* \*